United States Patent
Kumar et al.

(10) Patent No.: US 7,788,387 B2
(45) Date of Patent: Aug. 31, 2010

(54) METHOD AND SYSTEM FOR INCENTIVE-BASED AD HOC NETWORKING

(75) Inventors: Surender Kumar, Naperville, IL (US); Mark A. Birchler, Rosselle, IL (US); Randy L. Ekl, Lake Zurich, IL (US); Thomas C. Hill, Crystal Lake, IL (US); Michael D. Kotzin, Buffalo Grove, IL (US); Whay Chiou Lee, Cambridge, MA (US); Peggy K. Matson, Arlington Heights, IL (US); Peter J. Stanforth, Winter Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 925 days.

(21) Appl. No.: 11/464,040

(22) Filed: Aug. 11, 2006

(65) Prior Publication Data

US 2008/0037499 A1 Feb. 14, 2008

(51) Int. Cl.
*G06F 15/16* (2006.01)
*G06F 15/173* (2006.01)
*H04B 7/00* (2006.01)
*H04W 4/00* (2009.01)
*H04L 12/28* (2006.01)
*H04L 12/56* (2006.01)

(52) U.S. Cl. ............... 709/229; 709/201; 709/204; 709/226; 709/238

(58) Field of Classification Search .......... None
See application file for complete search history.

(56) References Cited

U.S. PATENT DOCUMENTS

| | | | |
|---|---|---|---|
| 6,247,057 B1 * | 6/2001 | Barrera, III | 709/229 |
| 2002/0062249 A1 * | 5/2002 | Iannacci | 705/14 |
| 2003/0202494 A1 * | 10/2003 | Drews et al. | 370/338 |
| 2004/0267932 A1 * | 12/2004 | Voellm et al. | 709/226 |
| 2005/0220101 A1 * | 10/2005 | Westhoff et al. | 370/389 |
| 2006/0067316 A1 | 3/2006 | Johnson et al. | |
| 2006/0167784 A1 * | 7/2006 | Hoffberg | 705/37 |
| 2007/0133488 A1 * | 6/2007 | Muthuswamy et al. | 370/338 |
| 2008/0040481 A1 * | 2/2008 | Joshi et al. | 709/226 |
| 2008/0205308 A1 * | 8/2008 | Prehofer et al. | 370/310 |

FOREIGN PATENT DOCUMENTS

WO 2008021704 A2 2/2008
WO 2008021704 A3 2/2008

OTHER PUBLICATIONS

PCT International Perliminary Report Application No. PCT/US2007/074698 Dated Feb. 26,2009—6 Pages.
PCT International Search Report and Written Report Application No. PCT/US2007/074698 Dated Jul. 3, 2008—6 Pages.
Buttyan et al.: Stimulating Cooperation in Self-Organization Mobile Ad Hoc Networks—Dated Mar. 19, 2002—22 Pages.

* cited by examiner

*Primary Examiner*—Hassan Phillips
(74) *Attorney, Agent, or Firm*—Barbara R. Doutre

(57) ABSTRACT

A system (100) and method (300) for mesh/ad hoc participation is provided. The method can include providing (310) an incentive to a user operating a device in an ad hoc network and determining (320) network resources associated with providing the incentive. The method can establish a credit system for devices within the ad hoc network, evaluate a supply and demand for the network resources, and allocate credits to the devices for forwarding packets in the ad hoc network. The method can determine a delivery capacity for the devices and negotiate an optimal packet route through the devices in the ad hoc network based on the supply and demand.

7 Claims, 6 Drawing Sheets

METHOD AND SYSTEM FOR INCENTIVE-BASED AD HOC NETWORKING

FIELD OF THE INVENTION

The present invention relates to mobile communication systems and, more particularly, to mesh/ad hoc networking.

BACKGROUND

Mesh networking can be an efficient and reliable way to route data, voice and instructions between nodes in a network. Mesh networking allows for continuous connections and reconfiguration within a network by allowing hopping from node to node. Mesh networks are decentralized, relatively inexpensive, generally reliable, and resilient, as each node (i.e., wireless device) needs only transmit as far as the next node. That is, nodes act as repeaters to transmit data from nearby nodes to peers that are too far away to reach, resulting in a network that can span large distances, especially over rough or difficult terrain. Mesh networks are reliable in that each node can connect to several other nodes, thereby offering alternate paths for establishing a connection. Mesh networks can also provide communication when a node becomes inoperable or a connection is terminated, as there are other nodes through which the data can be routed. For example, if one node drops out of the network, due to hardware failure or other reasons, the node's neighbors can search another route. Moreover, extra capacity can be installed by simply adding more nodes.

Although mesh networks are generally associated with wireless networks and wired networks, the present invention focuses on ad hoc wireless mesh networks. For example, a Wireless LAN (WLAN) is a local area network that uses radio frequencies to communicate between wireless enabled devices. Wireless mesh networking is mesh networking implemented over a Wireless LAN. As one example, the IEEE 802.11 ("Wi-Fi") wireless protocol can support an ad hoc networking system when no wireless access points are present. In a wireless ad hoc network, devices can manage themselves without the need for central control, such as a wireless access point. For example, a wireless connection can be established for the duration of a session without connection through a wireless access point. Instead, devices can discover other devices within range to form a wireless network for those devices. Devices may search for target nodes that are out of range by flooding the network with broadcasts that are forwarded by each node. For example, devices can communicate directly with one another making connections with one another over multiple nodes (multihop ad hoc network) without a wireless access point.

Mesh networks also provide a foundation for community wireless networks, or community wireless projects. Community wireless networks are largely a hobbyist-led development of interlinked computer networks using wireless LAN technologies. The community wireless networks are generally set up by users within a community. A community wireless network provides an alternative avenue to accessing the Internet where wired Internet access is generally unavailable or expensive. Community wireless networks provide creative ways of accessing the Internet, promote ubiquitous access to inspire wireless applications and software, publish community ideas and specifications openly, and help others create local wireless communities. The wireless networks may take advantage of the relatively affordable, standardized 802.11b (Wi-Fi) devices to build growing clusters of linked, citywide networks. The community wireless networks can be linked to the wider Internet, particularly where individuals can obtain unmetered Internet connections such as ADSL and/or cable modem at fixed costs and share them with friends.

A mesh/ad hoc network is a self-configuring peer-to-peer multi-hop network. Nodes in a mesh/ad hoc network need to help one another to forward packets to respective destinations. It is generally desirable for all participating nodes to cooperate among themselves so that predetermined system performance can be optimized while ensuring fairness in resource allocation. In reality, a node may refuse to forward packets for other nodes, either because it does not have enough resources or it is selfish. In principle, it is possible to define link and node metrics to characterize the ability of a node to forward packets for other nodes. Such metrics can be used to influence routing decisions. For example, a cumulative value of such metrics in path selection can be minimized for selecting an optimal rout. Such an approach, however, cannot support policy-based decisions of individual nodes to adjust their respective levels of contribution to packet forwarding over time based on availability of resources in respective nodes.

Prior art methods can provide credits to participating nodes for forwarding packets for other nodes. These methods generally operate based on a simple principle, wherein each node earns credit (typically in terms of a counter value or a number of tokens) by forwarding packets for other nodes, and spends credit when the node sends its own packets. Under a generic incentive system, a node's counter value or token count is increased when it forwards a packet for another node, and decreased proportionally to the number of hops it needs when it sends a packet to another node. A counter-based method can stimulate cooperation in a self-organizing mobile ad hoc network, wherein all nodes are selfish in the sense that each cooperates only to maximize the benefits it obtains from the network. That is, nodes may intentionally refuse to forward packets. Packets that are not forwarded are dropped which can lower network throughput and quality of service (QoS).

Also, nodes that happen to be located at parts of the network where traffic is low may be discriminated against regardless of their willingness to cooperate. For example, if traffic through a node is low relative to the node's own originating traffic, the node may be prevented from sending all its packets. As result, the node may experience significant packet loss and corresponding degradation in quality of service. On the other hand, if the traffic through the node is high relative to the node's own originating traffic, the node will have little incentive to forward packets for other nodes since doing so further limits the node's ability to send its own packets. Accordingly, such prior art methods are ineffective and inefficient, since much energy is wasted in transmitting packets that are subsequently dropped. In such a capacity, a need remains for an incentive-based system that is efficient for minimizing unnecessary packet loss and fair throughput regardless of traffic throughput.

Accordingly, a need exits for encouraging users to be a part of an ad hoc network and implementing a system for providing incentives. Moreover, the need should be implemented in a manner that is resourceful and financially beneficial to the users participating in the network.

SUMMARY

One embodiment of the invention is directed to a method for mesh/ad hoc participation. The method can include providing at least one incentive to a user for allowing a device to operate and relay communication in an ad hoc network, and determining network resources associated with providing the at least one incentive. The incentive to the user can optimize packet forwarding efficiency in the ad hoc network. A credit system can be established for devices within the ad hoc network, a supply and demand for the network resources can be evaluated, and credits can be allocated to the devices for forwarding packets in the ad hoc network. A a delivery capacity can be determined for the devices and negotiate an optimal packet route through the devices in the ad hoc network based on the supply and demand. In one aspect, network resources can be determined by probing devices in the ad hoc network for communication capabilities, selecting routes within the ad hoc network based on a quality of service and packet forwarding longevity in view of the probing, and negotiating at least one incentive for the routes based on a network resource. The step of probing devices can include determining a supply and demand for the network resources, and determining a delivery capacity for devices for collaboratively forwarding packets in the ad hoc network based on the supply and demand. A network resource can include at least one of a battery life of the device, a communication interference of the device, a security of the device, a load capacity of the device, and a community acceptance of the device in the ad hoc network.

In one arrangement, credits can be allocated to the devices as incentives for forwarding packets in the ad hoc network. Routes within the ad hoc network can be established based on the credits accumulated by the devices. Allocating credits can encourage user participation in the ad hoc network and optimize the packet routing. As another example, credits can be allocated as an incentive based on value, wherein a value is time-based, location-based, or context-based for providing route optimization. Packet routing optimization in the ad hoc network can be based on message types that identifies the value type. Furthermore, feedback can be provided for identifying cooperation and participation of the device in the ad hoc network.

A clearing house service can also be provided to the user for allowing users to trade and barter credits. In one aspect, ad hoc communities can be created that make collaborative decisions for incentive policies including managing, configuring, and policing incentive policies. This can include mandating a device in the ad hoc network to provide cooperative capabilities and services under urgent conditions, taxing a device for discouraging a user from joining the ad hoc community, collecting left-over credits and utilizing the left-over credits to attract other devices into the ad hoc network, and assessing all devices in the ad hoc network for redistributing credits to other devices into the ad hoc network in accordance with a supply and demand of resources.

Embodiments of the invention are also directed to a method for allocating credits. The method can be an adaptive incentive based system for ad hoc networks. A packet forwarding of the device can be adapted based on an availability of the network resources using a credit accumulation rate that is based on a topology, energy, and load of the network resources. The credit accumulation rate can determine credits offered to the device in the ad hoc network for delivering packets. The credit accumulation rate can minimize an unnecessary dropping of packets and provide an incentive for packet forwarding. In particular, the rate of accumulated credits provided to a device can be a dynamic function of a hop count, battery capacity, and a relative offered load, wherein said dynamic function optimally balances a supply and demand of network resources. The relative offered load is a ratio of a packet generation rate of the device to a rate at which packets are received by the device for forwarding.

Embodiments of the invention are also directed to a system for ad hoc participation. The system can include a plurality of mobile wireless user terminals for providing at least one incentive to a user operating a device in the ad hoc network, determining network resources associated with the providing the at least one incentive; and compensating the user for allowing the mobile wireless user terminal to relay communication in the ad hoc network in view of the network resources. The system can collectively determine a forwarding capacity for the mobile wireless user terminals and negotiates an optimal packet route through the ad hoc network. A credit system can be established for mobile wireless user terminals within the ad hoc network for providing the at least one incentive, a supply and demand for the network resources can be determined, and credits can be allocated to the mobile wireless user terminals for forwarding packets in the ad hoc network based on the supply and demand.

Embodiments of the invention are also directed to an apparatus for ad hoc networking. The apparatus can include a transceiver capable of receiving and transmitting signals including packetized signal, a memory capable of storing routing information pertaining to nodes in the ad hoc network from information contained in the signals from the transceiver, and a controller for controlling the transceiver and updating routing information, probing nodes in the ad hoc network for communication capabilities, selecting routes through nodes within the ad hoc network based on a quality of service and packet forwarding longevity in view of the probing, and negotiating at least one incentive for the routes based on a topology, energy, and load of the network resources.

BRIEF DESCRIPTION OF THE DRAWINGS

The features of the system, which are believed to be novel, are set forth with particularity in the appended claims. The embodiments herein can be understood by reference to the following description, taken in conjunction with the accompanying drawings, in the several figures of which like reference numerals identify like elements, and in which:

DETAILED DESCRIPTION

Figure 1:
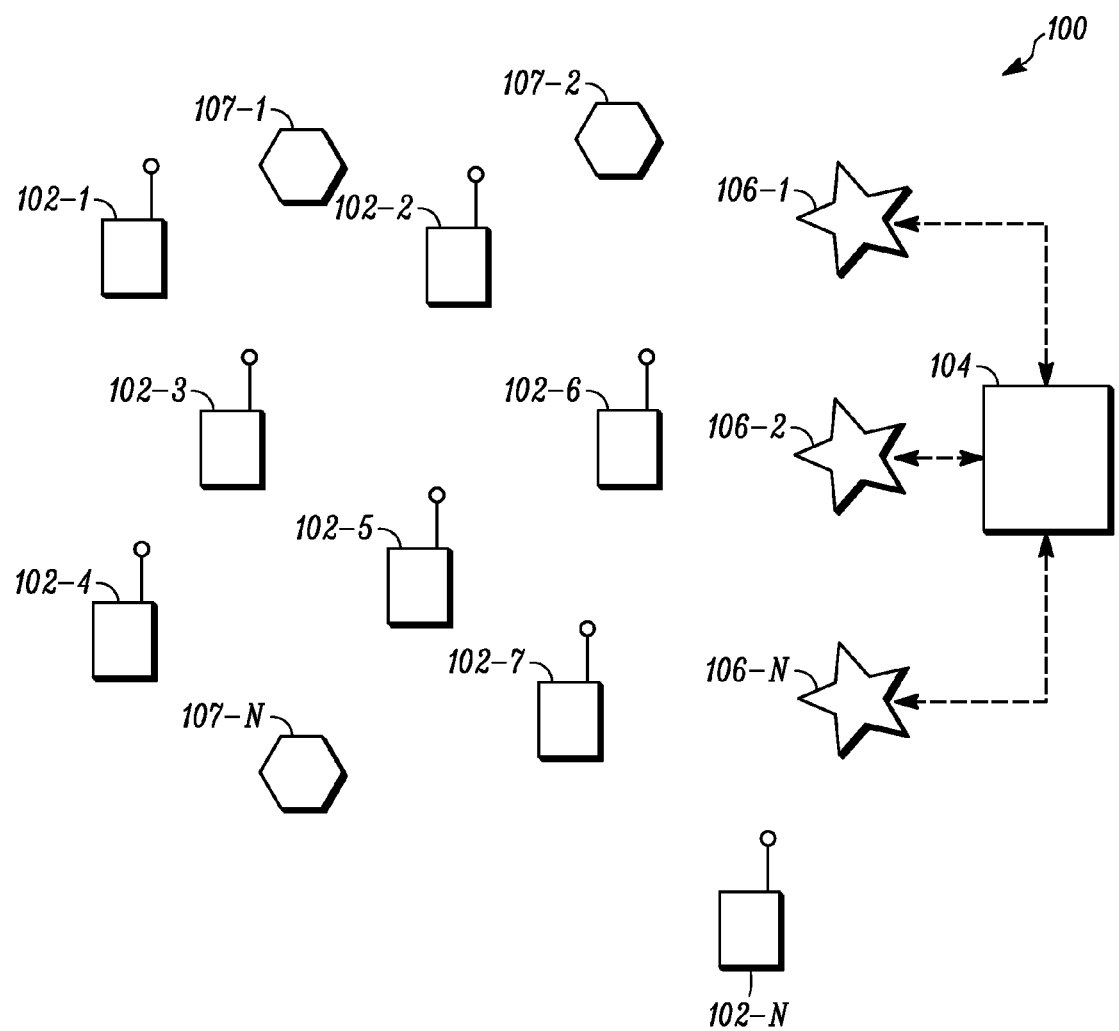
FIG. 1 is a block diagram of an example ad hoc wireless communications network including a plurality of nodes employing a system and method in accordance with an embodiment of the present invention.

While the specification concludes with claims defining the features of the embodiments of the invention that are regarded as novel, it is believed that the method, system, and other embodiments will be better understood from a consideration of the following description in conjunction with the drawing figures, in which like reference numerals are carried forward.

As required, detailed embodiments of the present method and system are disclosed herein. However, it is to be understood that the disclosed embodiments are merely exemplary, which can be embodied in various forms. Therefore, specific structural and functional details disclosed herein are not to be interpreted as limiting, but merely as a basis for the claims and as a representative basis for teaching one skilled in the art to variously employ the embodiments of the present invention in virtually any appropriately detailed structure. Further, the terms and phrases used herein are not intended to be limiting but rather to provide an understandable description of the embodiment herein.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "processing" can be defined as number of suitable processors, controllers, units, or the like that carry out a pre-programmed or programmed set of instructions. The terms "program," "software application," and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

FIG. 1

Referring to FIG. 1, a block diagram illustrating an example of an ad hoc wireless communications network 100 employing an embodiment of the present invention is shown. Specifically, the network 100 includes a plurality of mobile wireless user terminals 102-1 through 102-n (referred to generally as nodes 102 or mobile nodes 102), and can, but is not required to, include a fixed network 104 having a plurality of access points 106-1, 106-2, . . . 106-n (referred to generally as nodes 106, access points (APs) 106 or intelligent access points (IAPs) 106), for providing nodes 102 with access to the fixed network 104. The fixed network 104 can include, for example, a core local area network (LAN), and a plurality of servers and gateway routers to provide network nodes with access to other networks, such as other ad hoc networks, the public switched telephone network (PSTN) and the Internet. The network 100 further can include a plurality of fixed routers 107-1 through 107-n (referred to generally as nodes 107, wireless routers (WRs) 107 or fixed routers 107) for routing data packets between other nodes 102,106 or 107. It is noted that for purposes of this discussion, the nodes discussed above can be collectively referred to as "nodes 102, 106 and 107", or simply "nodes".

As can be appreciated by one skilled in the art, the nodes 102, 106 and 107 are capable of communicating with each other directly, or via one or more other nodes 102, 106 or 107 operating as a router or routers for packets being sent between nodes, as described in U.S. patent application Ser. No. 09/897,790, and U.S. Pat. Nos. 6,807,165 and 6,873,839.

FIG. 2

Figure 2:
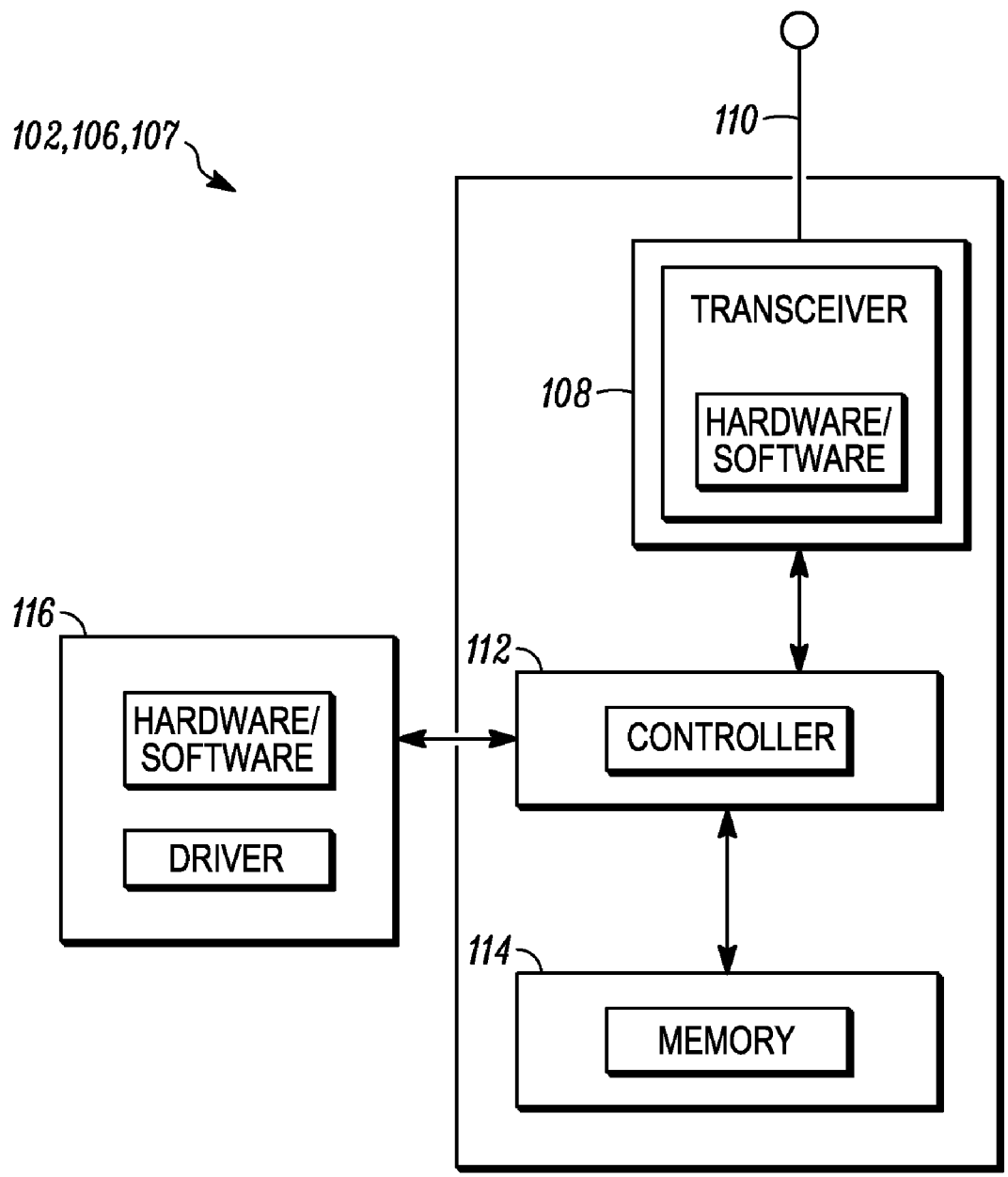
FIG. 2 is a block diagram illustrating an example of a mobile node employed in the network shown in FIG. 1.

As shown in FIG. 2, each node 102, 106 and 107 includes at least one transceiver or modem 108, which is coupled to an antenna 110 and is capable of receiving and transmitting signals, such as packetized signals, to and from the node 102, 106 or 107, under the control of a controller 112. The packetized data signals can include, for example, voice, data, multimedia information, instructions, and packetized control signals, including node update information.

Each node 102, 106 and 107 further includes a memory 114, such as a random access memory (RAM) that is capable of storing, among other things, routing information pertaining to itself and other nodes in the network 100. As further shown in FIG. 2, certain nodes, especially mobile nodes 102, can include a host 116 which may consist of any number of devices, such as a notebook computer terminal, mobile telephone unit, mobile data unit, or any other suitable device. Each node 102, 106 and 107 also includes the appropriate hardware and software to perform Internet Protocol (IP) and Address Resolution Protocol (ARP), the purposes of which can be readily appreciated by one skilled in the art. The appropriate hardware and software to perform transmission control protocol (TCP) and user datagram protocol (UDP) may also be included. The nodes 102 within the network can form a wireless ad hoc network. A node can be a mobile device, a cell phone, a radio, a portable media player, a laptop, or any other suitable communication device.

In one aspect, the controller 112 can probe mobile wireless user terminals 102-n in the ad hoc network for communication capabilities, select routes within the ad hoc network based on a quality of service and packet forwarding longevity in view of the probing, and negotiate at least one incentive for the routes based on at least one of a battery life of the mobile wireless user terminal, a communication interference of the mobile wireless user terminal in the ad hoc network, a security of the mobile wireless user terminal in the ad hoc network, a load capacity of the mobile wireless user terminal in the ad hoc network, and a community acceptance of the mobile wireless user terminal in the ad hoc network.

Ad hoc networks require the participation of many nodes for providing efficient and optimized networking. Value can be created through cooperative ad hoc networking capabilities made available by participating nodes. That is, an ad hoc network relies on the contribution of other nodes within the network to share resource loads, such as forwarding data packets. Various protocols are available which provide methods for route optimization and increase ad hoc network efficiencies. However, many users may not want to join the ad hoc network for certain reasons. For example, a user may not want to let their device, such as a mobile phone, be used to forward packets for another user. Understandably, this may reduce the battery life of the mobile device. The users are often not enticed to join an ad hoc network due to battery longevity, interference, security concerns, sharing concerns, or misinformation of device capabilities. Accordingly, embodiments of the invention are directed to providing incentives to users for allowing their devices to become a part of the ad hoc network, so that the ad hoc network operates efficiently and optimally.

FIG. 3

Figure 3:
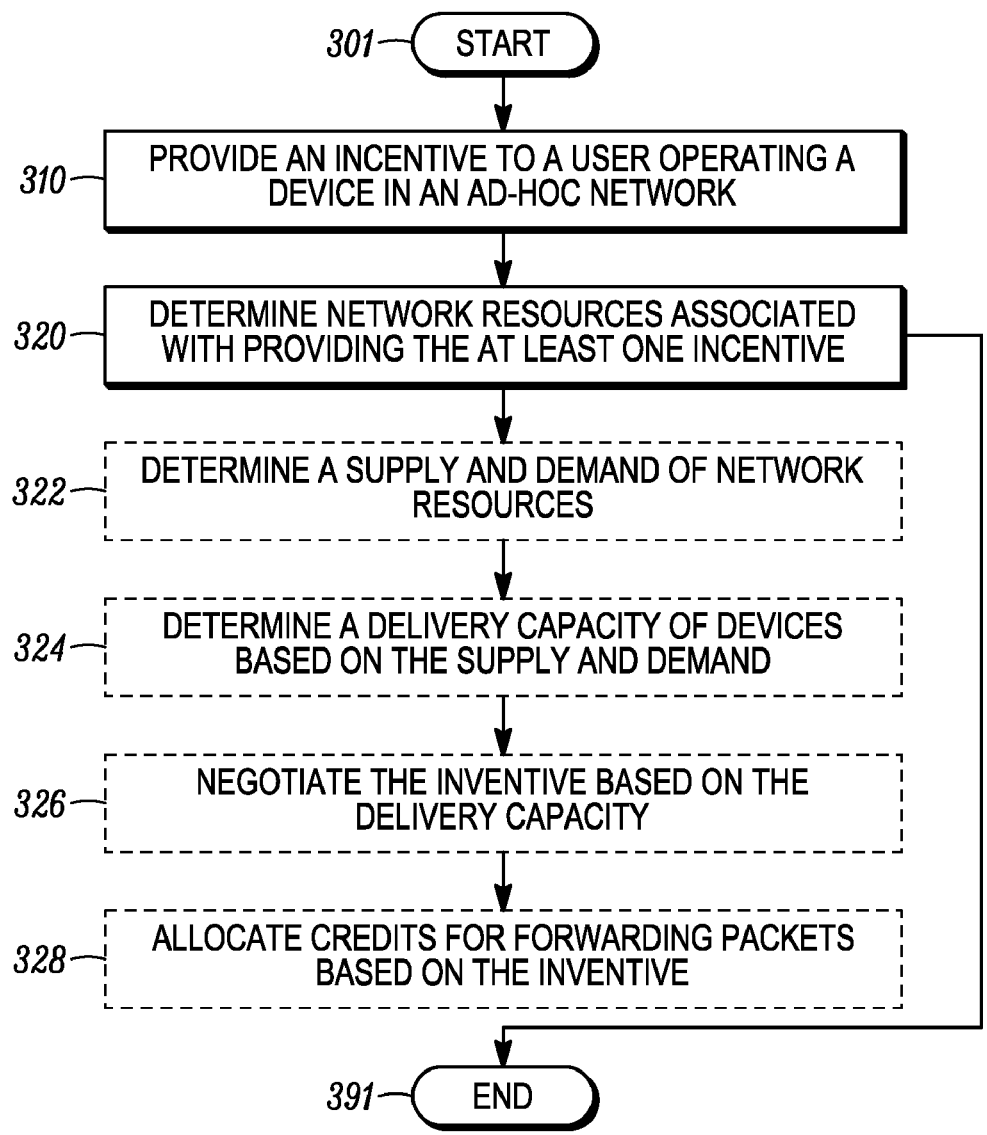
FIG. 3 is an model 300 for ad hoc participation in accordance with an embodiment of the present invention.

Referring to FIG. 3, an model 300 for ad hoc participation is shown. Briefly, the model 300 is a method that promotes collaboration, route optimization, and efficient operation of ad hoc networks. Moreover, the model provides an incentive to users to participate in an ad hoc network for supporting a shared network resource environment. Notably, the model 300 for ad hoc participation entices users to join the ad hoc network based on an incentive system that takes into account supply and demand for network system resources. By providing incentives, an ad hoc community can be created and supported to provide collective and informed decisions that are preferentially beneficial for a community.

In particular, the model 300 can be collectively implemented by one or more of the plurality of mobile wireless user terminals 102-n shown if FIG. 1. Briefly described, the model 300 can determine a forwarding capacity for the mobile wireless user terminals 102-n and negotiate an optimal packet route through the ad hoc network 100. Referring to FIG. 3, the method 300 can begin at step 301.

At step 310 at least one incentive can be provided to a user operating a device 102 (See FIG. 1) in an ad hoc network. As an example, an incentive can include providing credits to a user for allowing a use of their device 102 to become part of the ad hoc system, optimizing routes based on a supply and demand of network resources including user devices, providing a clearing house to allow users to trade usage of their unit or credits on the ad hoc system, and configuring/managing/policing the model/incentive based system. Managing an incentive policy can include mandating a device in the ad hoc network to cooperate capabilities and services under urgent conditions, taxing a device for discouraging a user from joining the ad hoc community, collecting left-over credits and utilizing the left-over credits to attract other devices into the ad hoc network, or assessing all devices in the ad hoc network for redistributing credits to other devices into the ad hoc network in accordance with the model. Dis-incentives can also be enforced for discouraging non cooperative users from joining the system. This may be considered a form of ad hoc community "shunning" of a unit due to bad behavior, illegal activity, competitive nature or other community reasons.

At step 320 network resources associated with providing the at least one incentive can be determined. Network resources can include one or more devices 102-n (See FIG. 1) within the network supporting the ad hoc network and their associated resources. For example a resource, can include a battery life of a device 102-n, a security of the device 102-n, or a load capacity of the device but is not herien limited to these. Determining network resources can be derived from of an model that establishes a credit system for devices within the ad hoc network. The model can determine (322) a supply and demand for the network resources, determine (324) a delivery capacity for the devices in view of the supply and demand, negotiate (326) an optimal packet route through the devices in the ad hoc network based on the delivery capacity, and allocate (328) credits to the devices for forwarding packets in the ad hoc network.

Briefly referring to FIG. 1, nodes 102, access points 106, and wireless routers 107, are considered network resources. As an example, nodes (e.g. devices) in the ad hoc network can be probed for communication capabilities, routes within the ad hoc network can be selected based on a quality of service and packet forwarding longevity in view of the probing, and at least one incentive for the routes can be negotiated based on a resource measure. A resource measure can be a battery life of the device, a communication interference of the device, a security of the device, a load capacity of the device, and a community acceptance of the device in the ad hoc network. Notably, the model outlined by steps (322-328) can identify an optimal route for packet delivery in the system based on a supply and demand of network resources.

In one aspect, the step of negotiating an incentive (326) optimizes a packet routing efficiency in the ad hoc network. The model 300 can allocate credits to devices within the ad hoc network which can be redeemed for various awards, such as air-time credits, cash, or trade. In one aspect, credits can be categorized based on value, wherein a value is time-based, location-based, or context-based for providing route optimization. In another aspect, a packet routing optimization in the ad hoc network can be determined based on message type, wherein a message type identifies the value category. Moreover, feedback can be provided for identifying cooperation and participation of devices in the ad hoc network. As an example, a compensation may include adjusting a billing rate to the user based on a participation of the device in the ad hoc network, adjusting an air-time value credit to the user to encourage participation in the ad hoc network and optimize the packet routing, and providing a clearing house community to the user for allowing users to trade and barter air-time value credits. Notably, providing incentives fosters the creation of ad hoc communities that make collaborative decisions in the ad hoc communities including managing, configuring, and policing the incentive policies. At step 321, the method can end.

In one arrangement, the model 300 can further include location based metrics to determine incentive policies. For example, nearby units may query approaching units as they come into proximity of an ad hoc network. The nearby units can determine a 'credit status' of the approaching units and offer incentives to the approaching units for joining the network. For example, an approaching unit may have a high credit rating which would provide value to the ad hoc network. Accordingly, the nearby devices within the ad hoc network can offer incentives to the high-credit approaching user to join for a 'debit' fee. As an example, such an encounter can be consummated by a single unit query, or a multi-unit query to determine if that unit offers route optimization; that is, one unit decides or the group 'votes' on how to economically entice the new joining unit. Accordingly, a percentage of ad hoc units can be designed with query and coordination capability to provide credit and debit capability for forming and managing ad hoc networks.

In another arrangement, the model 300 can implement economic policies and delegate responsibilities based on a supply and demand of resources within the ad hoc community. For example, referring back to FIG. 1, a controller unit 106 in a node 102 can be elected, or self-elected, and located in centralized/distributed manner. The controller units 106 may operate independent autonomous networks, or may operate depend networks (sending billing and economic information to a backend system as the designated unit). For example, the controller unit 106 with the most credits (economic value) can dictate an optimum routing to the other units within the ad hoc network. The controller unit and becomes the 'controller' for the ad hoc community and which may be centralized or distributed. As previously presented, credits may be stored and dispensed by categories, by one unit or a plurality of units. Credits may also be evaluated by value or use. For example, certain credits may be more valuable, or useful, than others based on a location of the devices, a time, or an event. That is, credits may be time-based in value to provide route optimization. Understandably, units do move in and out of the networks, or time of day traffic may increase or decrease the need for the credit. For example, nights and weekend minutes may be less valuable than daytime minutes. Credits may also be location or context based in value to provide route optimization (credits may have higher value in enterprise situations than at home). Credits may also be event based, for example during public expositions, concerts, or performances.

In another aspect, the economic mode 300 can provide feedback of economic, capability, and value that a single unit provides to the rest of the ad hoc network. For example, resource capabilities available to the device can be provided to other devices within the ad hoc community. The resource capabilities can include battery life, a communication interference, a security level, a load capacity, and a community acceptance but is not limited to these. The feedback can provide a measure or use of the resource capabilities such as bandwidth capacity, the number of packets forwarded, the number of resources being shared, and the type of data being supported. The feedback may be automated or user driven. Moreover, the feedback can be evaluated to determine a contribution and use of communication resources. That is economic value can be determined from the feedback. Units may be voted out of the ad hoc network due to behavior, or low economic value.

The model 300 can determine economic routing optimization for multiple messages occurring simultaneously and prioritize messages, route optimization and economics of paths, including anticipated message responses (i.e., are messages one-way, or two-way, symmetrical or asymmetrical?). Moreover, messages can be combined for reducing loading. Credits can be assigned based on the size of data delivery. For example, debits for 'bulk' carrying of messages may be lower than 'single' message carrier. Furthermore, credits can be allocated based on delivery distances. For example, route optimizations can be managed for "long distance" carrying of messages vs. 'short distance' carrying of messaging. One embodiment of the invention also entices units by incorporating a power adjustment metric for route optimization. For example, a unit can be enticed to transmit at high power in a sparse network for a delay-sensitive packet, and discouraged to transmit at high power in a dense network for a non-delay sensitive packet. Understandably, in a power limited situation, wherein users have lowered device power, it may be beneficial to increase unit power to increase data rate. This has the effect of getting one node off the channel quicker which may improve overall efficiency.

In practice, the model 300 can choose the most optimum low cost route, the most optimum route regardless of cost, or the most optimum route balancing all variables. The model 300 can be 'dialed' to optimize to the variable desired such as cost, battery life, and the like. Furthermore, the model 300 may be controlled collectively in units, or given to one unit to make decisions for the entire system as long as that unit is part of that system. In particular, a best route can be determined based on the incentive/dis-incentive polices of the model 300 which can take into account the nature of a node itself and a neighboring node. As an example, a node may be a unit such as mobile device, a radio, or a computer (fixed or mobile). At the outset of the transfer or communication, the unit probes the network with the request for service. The construction of numerous possible routes is obtained by probing and exchanging information including neighbors, signal strength, costs, incentives/dis-incentives, node characteristics, etc and is communicated back to the initiating unit. After getting all this information back the unit can select a "best" route for that particular transmission or communication. The selection is based on resources metrics which can include Quality of Service (QoS) information and expectation on longevity.

In the foregoing, a novel adaptive incentive-based method for ad hoc network participation is described in accordance with the embodiments presented above. The adaptive incentive-based method encourages users for allowing their devices to join an ad hoc network. In particular, the method provides a rate of credit accumulation for forwarding packets that is a function of topology, energy, and load.

Briefly, the adaptive incentive-based method dynamically allocates packet forwarding credits based on availability of network resources by using an adaptive credit accumulation rate. In one embodiment, the rate of credit accumulation for forwarding packets is proportional to a dynamic factor that is a based on a topology, energy, and load of the network resources. In particular, the dynamic factor is a function of a number of system parameters including: battery capacity, initial counter value, estimated number of intermediate nodes, and relative offered load (i.e., ratio of generation rate of own packets to rate at which forwarding packets are received). The method can minimize unnecessary dropping of packets and provide incentives to a node to forward packets for other nodes when its relative offered load is high. A relative offered load is a ratio of a packet generation rate of the device to a rate at which packets are received by the device for forwarding. The method can also be extended to incorporate additional system parameters to support various resource allocation policies. For example, the credit accumulation rate can be a function of minimum transmission power needed to achieve a predetermined range. Specifically, the credit accumulation rate can be positively correlated with this minimum transmission power in order to offer additional packet forwarding incentive to a node that happens to be located far away from its nearest neighbor. The following variables are defined below which are carried forward in describing the method.

| Variable | Definition |
| --- | --- |
| $IN_o$ | Number of packets (referred to as own packets) generated by a given node |
| $IN_f$ | Number of packets (referred to as forwarding packets) that are received by the given node for forwarding |
| $OUT_o$ | Number of own packets sent by the given node |
| $OUT_f$ | Number of packets forwarded by the given node on behalf of other nodes |
| $DRP_o$ | Number of own packets that are dropped by the given node |
| $DRP_f$ | Number of forwarding packets that are dropped by the given node |
| $R_o$ | Packet generation rate of the given node (assumed constant) |
| $R_f$ | Rate at which packets are received by the given node for forwarding (assumed constant) |
| N | Estimated number of intermediate nodes between source and destination nodes |
| C | Initial counter value |
| B | Battery capacity in terms of a maximum number of packets the given node is able to send or forward before its battery is drained out |
| $T_{end}$ | Time at which battery of the given node is drained out |

For simplicity, N is assumed to be a constant. In particular, N may be set to an average number of intermediate nodes between any pair of source and destination nodes. Otherwise, N may be estimated as recommended in [2], wherein $N=$[(distance between source and destination nodes)/(power range)]$-1$.

This provides a lower-bound on the number of intermediate nodes needed to forward a packet from the source node to the destination node.

The table below contains a number of derived expressions based on the variables defined above.

| Equation Number | Equation | Explanation |
| --- | --- | --- |
| (1) | $OUT_o \leq C/N < B$ | Assumption that initial counter value of the given node is not enough to drain its battery out by sending only its own packets |
| (2) | $0 \leq OUT_o + OUT_f = B$ | Constraint of battery power |
| (3) | $0 \leq \dfrac{OUT_o}{R_o} \leq T_{end}$ for $R_o > 0$ | Constraint of battery power drain time on number of own packets sent |
| (4) | $0 \leq \dfrac{OUT_f}{R_f} \leq T_{end}$ for $R_f > 0$ | Constraint of battery power drain time on number of forwarding packets forwarded |
| (5) | $IN_o = R_o T_{end} \geq 0$ | Number of own packets generated before battery power is drained |
| (6) | $IN_f = R_f T_{end} \geq 0$ | Number of forwarding packets received before battery power is drained |
| (7) | $DRP_o = IN_o - OUT_o \geq 0$ | Own packets that are not sent are dropped |
| (8) | $DRP_f = IN_f - OUT_f \geq 0$ | Forwarding packets that are not forwarded are dropped |
| (9) | $(R_o + R_f)T_{end} \geq B$ | Combining (2), (3), and (4) |
| (10) | $OUT_o \geq B - (R_f/R_o).IN_o$ | Combining (2), (4), and (5) |
| (11) | $IN_f = (R_f/R_o).IN_o$ | Combining (7) and (8) |
| (12) | $DRP_o + DRP_f = (R_o + R_f)T_{end} - B \geq 0$ | Combining (2), (5) through (8), and using (9) |
| (13) | $DRP_f = (R_f/R_o).IN_o + OUT_o - B$ | Combining (2), (9), and (14) |
| (14) | $N.OUT_o - H.OUT_f \leq C$ | Constraint of initial counter value |
| (15) | $OUT_o \leq \dfrac{C + HB}{N + H} < B$ | Combining (2) and (16), and using (1) |

Note that $(C + HB)/(N + H)$ varies from $C/N$ to $B$ as $H$ varies from 0 to infinity.

FIG. 4

Figure 4:
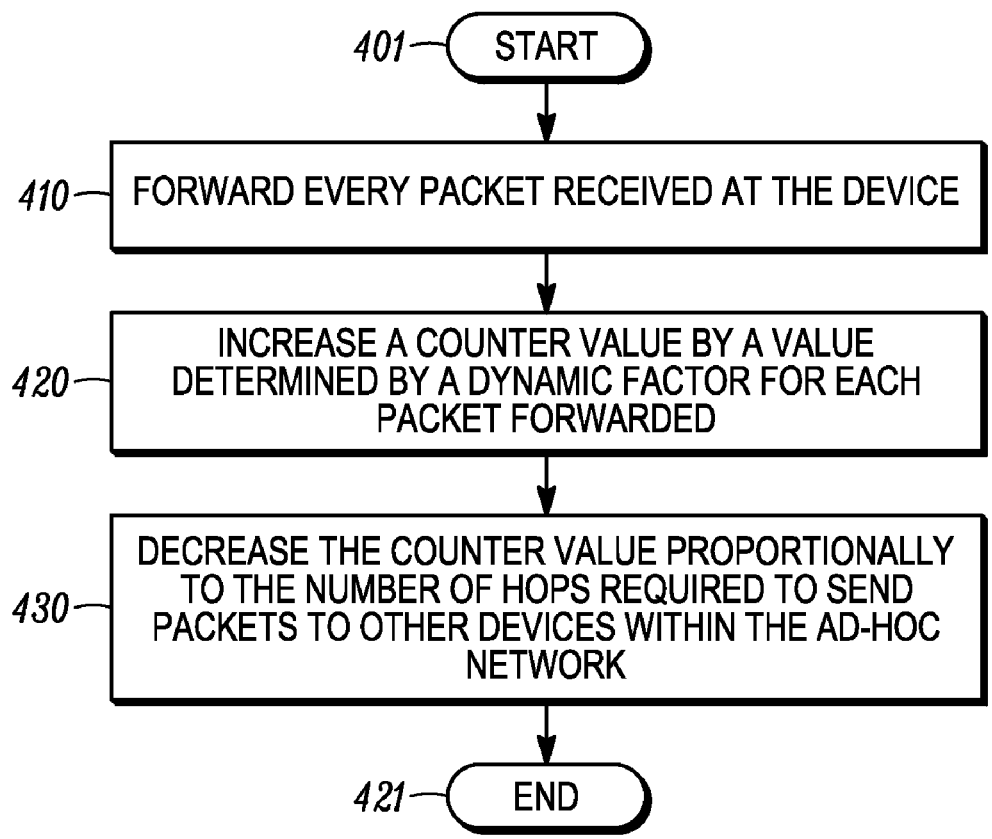
FIG. 4 is an adaptive incentive-based for ad hoc participation in accordance with an embodiment of the present invention.

Referring to FIG. 4, the adaptive incentive-based method 400 is described. The adaptive incentive-based method 400 establishes a credit system for devices within the ad hoc network by balancing supply and demand for the network resources. It should be noted that the method 400 can be practiced with more or less than the number of components shown. The method 400 is directed to providing incentives to a device based on a number of packets the device originates and a number of packets the device forwards. Understandably, a user of the device may employ the device for personal use such as receiving or sending internet, email, or data. In this scenario, the device originates data since the data is sent directly to or from the device. In another case, a user of the device may allow other devices within the ad hoc network to use the device's resources. In this case, the device is said to forward data.

In accordance with the present invention, a node forwards every forwarding packet received and increases its counter value by a value determined by the dynamic factor for each packet forwarded. The node spends down its counter value proportionally to the number of hops it needs when it sends a packet to another node. For example, referring to FIG. 4, the method 400 can begin at step 401. at step 410 packets received at the device can be forwarded. At step 420, a counter value can be increased by a value determined by a dynamic factor for each packet forwarded. At step 430, the counter value can be decreased proportionally to the number of hops required to send packets to other devices within the ad hoc network. At step 421, the method can end. The dynamic factor can be a function of a hop count, battery capacity, and a relative offered load, and the rate of credit accumulation for forwarding packets is proportional to the dynamic factor.

The adaptive rate increases the counter value of a node for each packet it forwards on behalf of another node. Specifically, the counter value is increase by H instead of one for each packet forwarded, and H is a function of B, C, N, $R_o$, and $R_f$, as described below. Since the system adapts to topology (i.e., N), energy (i.e., B), and load (i.e., $R_o$ and $R_f$), we refer to this system by CARTEL, an acronym that stands for Credit Accumulation Rate adaptation based on Topology, Energy, and Load.

When the condition of $(HB+C)/(N+H)=BR_o/(R_o+R_f)$, i.e., $R_o/R_f=(HB+C)/(NB-C)$ holds, no packets need to be dropped. That is, Equations (14) and (15) are unique extensions that mitigate packet dropping. This allows a node to forward enough packets for other nodes so that its own counter value is large enough to allow the node to send all its own packets. Accordingly, less forwarding packets are subject to drop by the node, because its counter value is sufficiently maintained to provide an incentive that allows it to forward packets and send all its own packets. In other words, it allows a node to send its own packets because it is cooperating with nodes in the network.

FIG. 5

Figure 5:
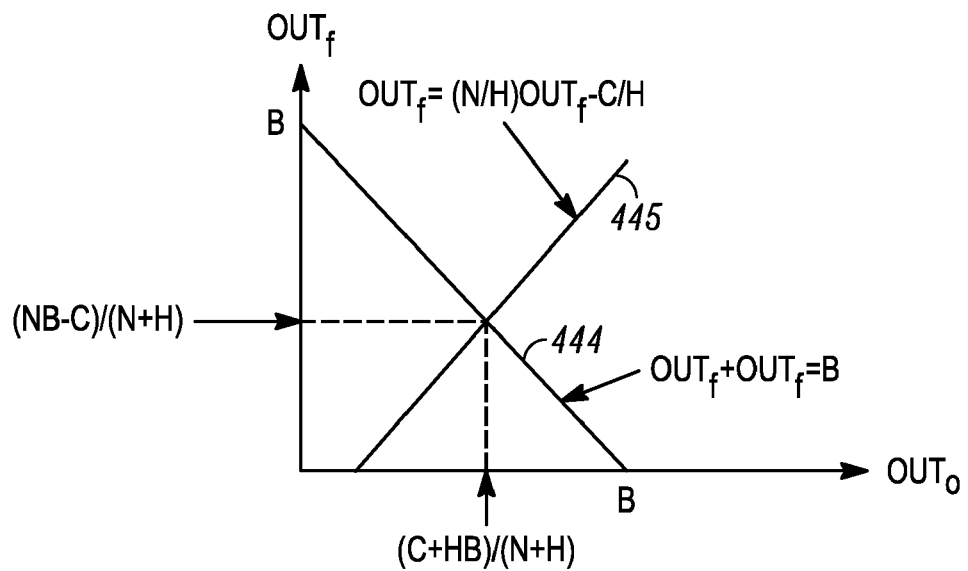
FIG. 5 is a plot showing credit rate accumulation in accordance with an embodiment of the present invention.

The relationship between $OUT_o$ and $OUT_f$ is shown in FIG. 5. In this figure, the line 444 corresponds to EQ (2) and the line 445 corresponding to EQ (15). It can be verified that the point at which these two lines cross each other is given by $OUT_o=(C+HB)/(N+H)$ and $OUT_f=(NB-C)/(N+H)$. In practice, $B>>C$, and we have $OUT_o \approx HB/(N+H)$ and $OUT_f \approx NB/(N+H)$.

To ensure that the condition $R_o/R_f=(HB+C)/(NB-C)$ holds, the following equality is established:

$$H = \frac{R_o}{R_f}\left(\frac{NB-C}{B}\right) - \frac{C}{B}$$

In this case, we have $IN_o = OUT_o = BR_o/(R_o+R_f)$, and $IN_f = OUT_f = BR_f/(R_o+R_f)$. It follows that $DRP_o = DRP_f = 0$.

FIG. 6

Next, let us define $\alpha = R_o/R_f$, and explicitly express H as a function of $\alpha$ as follows.

$$H(\alpha) = \alpha\left(\frac{NB-C}{B}\right) - \frac{C}{B}$$

Figure 6:
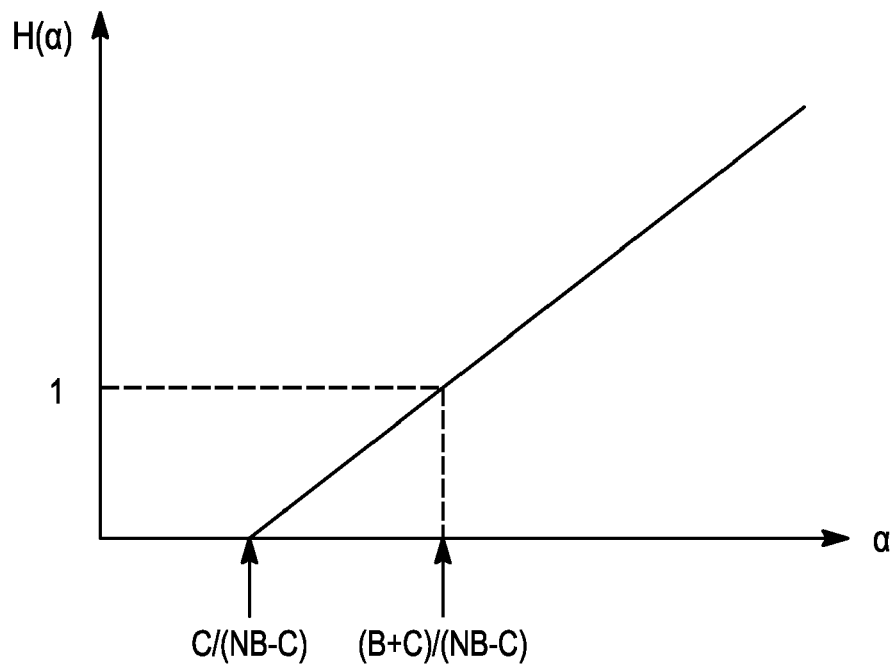
FIG. 6 is another plot showing credit rate accumulation in accordance with an embodiment of the present invention.

Note that $H(\alpha)$ depends implicitly on battery capacity B, initial counter value C, and estimated hop count N. It can be verified that $H(\alpha) > 0$ for $\alpha \geq C/(NB-C)$, and when $H(\alpha) = 1$, $\alpha = (B+C)/(NB-C)$. A graph of $H(\alpha)$ versus $\alpha$ is shown in FIG. 6. When B>>C, we have $H(\alpha) \approx \alpha N$.

FIG. 7

Figure 7:
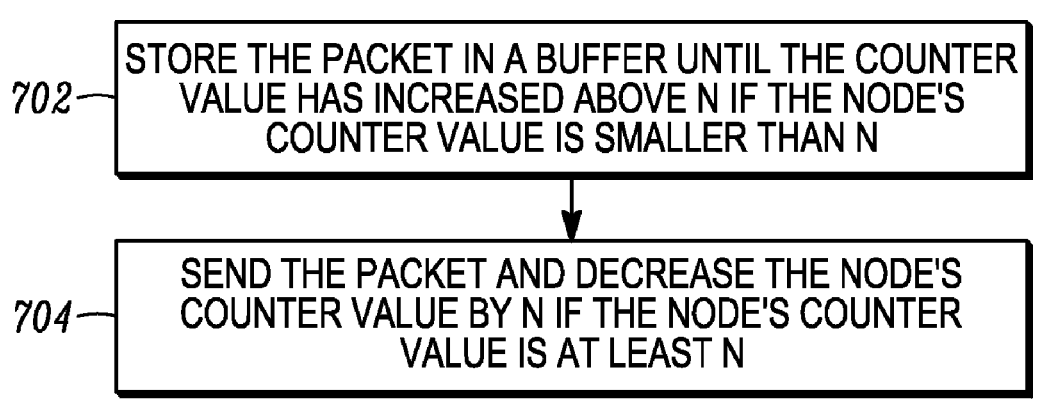
FIG. 7 is a method for allocating credits in accordance with an embodiment of the present invention

Briefly referring to FIG. 7, credits can be allocated to participating nodes in accordance with the credit rate accumulation method 400. The following steps can be used when the node has a packet to send. For example, at step 702, if the node's counter value is smaller than N, the packet is stored in a buffer until the counter value has increased above N. At step 704, if the node's counter value is at least N, the packet is sent and the node's counter value is decreased by N. The node forwards every forwarding packet received and increases its counter value by $\lceil H(\alpha) \rceil$ for each packet forwarded. Note that $\lceil H(\alpha) \rceil \geq 1$ for $\alpha > 0$ and B>>C. Notably, the counter is incremented by a dynamic factor which may be greater or equal to one.

The rate of credit accumulation for forwarding packets is proportional to a dynamic factor, H, that is a function of a number of system parameters. Specifically, the system parameters include (a) battery capacity; (b) initial counter value; (c) estimated number of intermediate nodes; (d) relative offered load (i.e., ratio of generation rate of own packets to rate at which forwarding packets are received). In accordance with the present embodiment, a node forwards every forwarding packet received and increases its counter value by a value determined by the dynamic factor for each packet forwarded. The node spends down its counter value proportionally to the number of hops it needs when it sends a packet to another node. Notably, incentive can be provided to users wherein credits are allocated to devices in the ad hoc network in accordance with a credit accumulation rate. The ad hoc network can adapt to topology, energy, and load, by employing a credit accumulation rate that is a function of estimated hop count, battery capacity, and relative offered load.

The rate of credit accumulation can be applied to nodes within an ad hoc network for establishing a credit system that is fair and one which provides optimal routing of packet deliveries. Understandably, the method 400 motivates users to forward packets for others by offering credit in return for offering network assistance, whereby the assistance may drain the limited battery power of the device or lower a bandwidth available to the user. Within the ad hoc network, incentives can be provided for forwarding packets for other users. Moreover, within a mesh/ad hoc network, users can form communities to share information and exchange credits as previously discussed.

The adaptive incentive-based method 400 ensures fairness for delivering data packets in an ad hoc network among all nodes regardless of relative offered load. The method 400 is adaptive to changing relative offered load and hence ensures that no nodes are discriminated against when they happen to be located at parts of the network where traffic is low. Moreover, the method 400 is efficient in that it attempts to minimize unnecessary dropping of packets. The method 400 provides greater incentive (less frustration due to lower packet loss) to a node to forward packets for other nodes when its relative offered load is high, and maintains the node's incentive to forward packets for other nodes when its relative offered load is low. The relative offered load capacity is a ratio of a packet generation rate of the device to a rate at which packets are received by the device for forwarding, wherein forwarding decisions are based on the relative offered load capacity and not on a packet-to-packet decision basis. Moreover, the method 400 facilitates practical implementation since each node does not have to decide on a packet-by-packet basis whether to forward a forwarding packet it has received.

In the aforementioned description, a mesh/ad hoc network has been described that is composed of numerous devices that collectively work together to route traffic through an ad hoc network based on a supply and demand of network resources. An incentive based system was established for users to allow their devices to be part of the ad hoc network. One embodiment provided an incentive-based system that included a rate accumulation method for implementing a credit system which is fair within the ad hoc network based on a supply and demand of network resources. The adaptive incentive-based method 400 allocated credits to nodes in the ad hoc network thereby providing a foundation for the model 300 of FIG. 3. The model 300 encouraged users to allow their units to become a part of an ad hoc network through economic incentives and dis-incentives metrics based on a supply and demand of network resources.

In one aspect, users can trade air-time credits through an ad hoc bartering system available to the community of users within the ad hoc network. For example, units may group together and create an ad hoc method to barter incentives. Units may barter, volunteer, or trade incentives based on defined or negotiated context covering capability, battery life, airtime value 'credit etc' with other individual units or groups of units. For example, a first user may trade battery usage on the first user's device for air-time credits accumulated and available a second user. That is, the first user can trade a communication resource for an incentive provided to a second user. As another example, one unit may be designated as the bartering 'clearing house'. Alternatively, the method for bartering may be spread amongst a group of units or the entire community of units. For example—fire and police can barter incentives to share and optimize a delivery of packets within route. An incentive may be the sharing of battery life between units based on a location of the units and a second incentive may be the speed of delivery through the network. Understandably, the bartering of resources is not for a personal or financial gain, but for a collective incentive to share resources that provide a collective benefit to the bartering community.

In another arrangement, groups may form to collect credits to entice use of other groups or individuals to join their ad hoc system. In certain cases these communities may be grouped by message type, battery life, or capability—thus, creating an economic strata of communities that barter based on their value. As one example, low value groups can collect credits to barter with high value groups to create optimum routes for low value messages. Credits may also be provided to one unit that is holding out. For example, the entire community can assemble together and offer credits to one unit to entice the unit to join the community. For instance, the entire system may collect left over credits, credits volunteers, or 'assessed' credits to entice an important unit to join the ad hoc system. That is, the entire system can assess all units for credits to be redistributed to entice certain units to join for providing maximum benefit to the ad hoc community as a whole.

In another aspect, the model 300 can completely bar or discourage a unit from joining an ad hoc network by 'taxing' that unit more heavily than others. This can include rescinding credits that are available from that unit to join that ad hoc network. However, the model can continue to employ undesirable units for basic ad hoc networking needs such as beacon, timing, etc and bar them from using any services offered by the cooperating ad hoc network. Furthermore, the model 300 can mandate certain units to join the ad hoc network under conditions deemed urgent to the entire ad hoc network. For example, such a scenario may occur when a call is being dropped, a unit's battery power is being lost, or a unit refuses to join. The model 300 can signal the uncooperative unit (or unit lacking enough credits to join) to join the ad hoc network but will. The model 300 can also adjust an incentive to the unit for cooperating or being mandated to cooperate within the ad hoc network. As another example, a unit may be mandated to give up all incentives to become a part of the ad hoc system during emergencies (such as 911).

Where applicable, the present embodiments of the invention can be realized in hardware, software or a combination of hardware and software. Any kind of computer system or other apparatus adapted for carrying out the methods described herein are suitable. A typical combination of hardware and software can be a mobile communications device with a computer program that, when being loaded and executed, can control the mobile communications device such that it carries out the methods described herein. Portions of the present method and system may also be embedded in a computer program product, which comprises all the features enabling the implementation of the methods described herein and which when loaded in a computer system, is able to carry out these methods.

While the preferred embodiments of the invention have been illustrated and described, it will be clear that the embodiments of the invention is not so limited. Numerous modifications, changes, variations, substitutions and equivalents will occur to those skilled in the art without departing from the spirit and scope of the present embodiments of the invention as defined by the appended claims.

What is claimed is:

1. A method for ad hoc participation, comprising:
at one or more devices:
providing at least one incentive to a user for allowing a device of the one or more devices to operate and relay communication in an ad hoc network by allocating credits to the device for forwarding packets in the ad hoc network, providing a clearing house service to the user for allowing users to trade and barter credits, and establishing routing within the ad hoc network based on credits;
determining network resources associated with providing the at least one incentive;
mandating the device in the ad hoc network to provide cooperative capabilities and services under urgent conditions;
wherein the incentive to the user optimizes packet forwarding efficiency in the ad hoc network; and
creating ad hoc communities that make collaborative decisions for incentive policies in the ad hoc communities including managing, configuring, and policing incentive policies, wherein the managing, configuring, and policing incentive policies further comprises:
taxing the device for discouraging a user from joining the ad hoc community;
collecting left-over credits and utilizing the left-over credits to attract other devices into the ad hoc network; and
assessing all devices in the ad hoc network for redistributing credits to other devices into the ad hoc network.

2. The method of claim 1, wherein the determining network resources further comprises:
probing devices in the ad hoc network for communication capabilities;
selecting routes within the ad hoc network based on a quality of service and packet forwarding longevity in view of the probing; and
negotiating at least one incentive for the routes based on at least one of a battery life of the device, a communication interference of the device, a security of the device, a load capacity of the device, or a community acceptance of the device in the ad hoc network.

3. The method of claim 1, wherein the determining network resources further comprises:
determining a supply and demand for the network resources; and
determining a delivery capacity for devices for collaboratively forwarding packets in the ad hoc network based on the supply and demand.

4. The method of claim 1, further comprising:
categorizing credits based on value, wherein a value is time-based, location-based, or context-based for providing route optimization;
determining packet routing optimization in the ad hoc network based on message types; and
providing a feedback for identifying cooperation and participation of the device in the ad hoc network.

5. A method for ad hoc participation, comprising:
at one or more devices:
providing an incentive to a user for allowing a device of the one or more devices of the user to operate in an ad hoc network;
determining a supply and demand for network resources associated with the providing an incentive;
implementing a credit accumulation rate to minimize an unnecessary dropping of packets and provide an incentive for packet forwarding;
mandating the device in the ad hoc network to provide cooperative capabilities and services under urgent conditions;
managing an incentive policy for allocating credits to the device for optimizing packet delivery among one or more routes in the ad hoc network;
taxing the device for discouraging a user from joining the ad hoc community; and
collecting left-over credits and utilizing the left-over credits to attract other devices into the ad hoc network; and
assessing all devices in the ad hoc network for redistributing credits to other devices into the ad hoc network.

6. A system for ad hoc networking, comprising
a plurality of mobile wireless user terminals for:
providing at least one incentive to a user operating a mobile wireless user terminal from the plurality of mobile wireless user terminals in the ad hoc network;
determining network resources associated with the providing the at least one incentive;

compensating the user for allowing the mobile wireless user terminal to relay communication in the ad hoc network in view of the network resources;
wherein the plurality of mobile wireless user terminals determine a forwarding capacity for the mobile wireless user terminals and negotiate an optimal packet route through the ad hoc network by:
establishing a credit system for mobile wireless user terminals within the ad hoc network for providing the at least one incentive;
determining a supply and demand for the network resources;
allocating credits to the plurality of mobile wireless user terminals for forwarding packets in the ad hoc network based on the supply and demand; and
mandating at least one of the plurality of mobile wireless users terminals in the ad hoc network to provide cooperative capabilities and services under urgent conditions;
taxing the mobile wireless user terminal for discouraging a user from joining the ad hoc community;
collecting left-over credits and utilizing the left-over credits to attract other plurality of mobile wireless user terminals into the ad hoc network; and
assessing the plurality of mobile wireless user terminals in the ad hoc network for redistributing credits to other mobile wireless users terminals in the plurality of mobile user terminals into the ad hoc network.

7. An apparatus for ad hoc networking, comprising:
a transceiver capable of receiving and transmitting signals including packetized signals;
a memory capable of storing routing information pertaining to nodes in the ad hoc network from information contained in the signals from the transceiver;
a controller for
controlling the transceiver and updating routing information;
probing nodes in the ad hoc network for communication capabilities;
selecting routes through nodes within the ad hoc network based on a quality of service and packet forwarding longevity in view of the probing; and
mandating the nodes in the ad hoc network to provide cooperative capabilities and services under urgent conditions;
negotiating at least one incentive for the routes based on a topology, energy, and load of the network resources;
taxing the nodes for discouraging a user from joining the ad hoc community;
collecting left-over credits and utilizing the left-over credits to attract other nodes into the ad hoc network; and
assessing all nodes in the ad hoc network for redistributing credits to other nodes into the ad hoc network.

* * * * *

UNITED STATES PATENT AND TRADEMARK OFFICE
CERTIFICATE OF CORRECTION

| | |
|---|---|
| PATENT NO. | : 7,788,387 B2 |
| APPLICATION NO. | : 11/464040 |
| DATED | : August 31, 2010 |
| INVENTOR(S) | : Kumar et al. |

It is certified that error appears in the above-identified patent and that said Letters Patent is hereby corrected as shown below:

In Column 4, Line 54, delete "invention" and insert -- invention. --, therefor.

In Column 16, Line 61, in Claim 6, delete "comprising" and insert -- comprising: --, therefor.

In Column 18, Line 7, in Claim 7, delete "for" and insert -- for: --, therefor.

Signed and Sealed this
Twenty-seventh Day of November, 2012

David J. Kappos
*Director of the United States Patent and Trademark Office*